(12) United States Patent
Torii et al.

(10) Patent No.: US 7,709,096 B2
(45) Date of Patent: May 4, 2010

(54) COATING COMPOSITION, FLUORINE-CONTAINING LAMINATE AND RESIN COMPOSITION

(75) Inventors: Hiroshi Torii, Settsu (JP); Nobuyuki Tomihashi, Settsu (JP); Daisuke Mikame, Settsu (JP); Yoshihiro Soda, Settsu (JP); Koichiro Ogita, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 964 days.

(21) Appl. No.: 11/270,477

(22) Filed: Nov. 10, 2005

(65) Prior Publication Data

US 2006/0063889 A1 Mar. 23, 2006

Related U.S. Application Data

(63) Continuation of application No. 10/740,900, filed on Dec. 22, 2003, now Pat. No. 7,034,076, which is a continuation of application No. PCT/JP03/14171, filed on Nov. 7, 2003.

(30) Foreign Application Priority Data

| Nov. 22, 2002 | (JP) | ............................ 2002-339293 |
| Jan. 29, 2003 | (JP) | ............................ 2003-020965 |
| Jun. 17, 2003 | (JP) | ............................ 2003-172258 |

(51) Int. Cl.
- B32B 15/082 (2006.01)
- B32B 15/088 (2006.01)
- C08L 79/08 (2006.01)

(52) U.S. Cl. ...................... 428/458; 428/461; 428/463; 428/473.5; 428/476.3; 428/476.9

(58) Field of Classification Search ................. 428/458, 428/461, 463, 473.5, 476.3, 476.9
See application file for complete search history.

(56) References Cited

U.S. PATENT DOCUMENTS

| 3,964,936 A | 6/1976 | Das |
| 4,139,576 A | 2/1979 | Yoshimura et al. |
| 4,177,320 A | 12/1979 | Yoshimura et al. |
| 5,616,388 A | 4/1997 | Tatsuno et al. |
| 5,789,083 A | 8/1998 | Thomas |
| 5,846,645 A | 12/1998 | Yokota et al. |
| 6,761,964 B2 * | 7/2004 | Tannenbaum ............... 428/213 |
| 6,911,512 B2 * | 6/2005 | Jing et al. .................... 526/242 |

FOREIGN PATENT DOCUMENTS

| EP | 0786290 A1 | 7/1997 |
| JP | 53073222 A | 6/1978 |
| JP | 53073228 A | 6/1978 |
| JP | 53-74532 | 7/1978 |
| JP | 2-4880 | 1/1990 |
| JP | 3-181559 | 8/1991 |
| JP | 6-345822 A | 12/1994 |
| JP | 8300560 A | 11/1996 |
| JP | 8-322732 | 12/1996 |
| JP | 10-330651 | 12/1998 |
| JP | 2002270415 A | 9/2002 |
| WO | WO 94/14904 | 7/1994 |

OTHER PUBLICATIONS

English translation of International Search Report for PCT/JP03/14171 dated Feb. 24, 2004.

* cited by examiner

*Primary Examiner*—Ana L Woodward
(74) *Attorney, Agent, or Firm*—Sughrue Mion, PLLC

(57) ABSTRACT

A coating composition including an amide group-containable macromolecule compound (A) having an amide group or to have an amide group and an anti-oxidizing material (B) capable of inhibiting oxidation of the amide group. The amide group-containable macromolecule compound (A) is an amide group-containing polymer (a1) having an amide group and an aromatic ring, and/or an amide group-containing-polymer precursor (a2) to convert into the amide group-containing polymer (a1) by baking at a time of coating with said coating composition. The anti-oxidizing material (B) accounts for 0.1 to 20 mass % of a total amount of said amide group-containable macromolecule compound (A) and the anti-oxidizing material (B).

22 Claims, No Drawings

US 7,709,096 B2

COATING COMPOSITION, FLUORINE-CONTAINING LAMINATE AND RESIN COMPOSITION

CROSS REFERENCE TO RELATED APPLICATIONS

This is a continuation of application Ser. No. 10/740,900 filed Dec. 22, 2003 now U.S. Pat No. 7,034,076, which is a continuation of PCT/JP03/14171 filed Nov. 7, 2003. The entire disclosures of the prior applications, application Ser. No. 10/740,900 and PCT/JP03/14171, are hereby incorporated by reference.

TECHNICAL FIELD

The present invention relates to a coating composition, a fluoro-laminate and a resin composition.

BACKGROUND ART

Coating film prepared from fluororesin has a wide range of uses in coating to form fluororesin layers on substrates of articles, which need corrosion resistance, a non-cohesion property and heat resistance, such as bread-baking molds, and rice cookers. However, since the fluororesin is poor in adhesion to substrates made of metals, ceramics or the like because of the non-cohesion property thereof, substrates coated with primers having an affinity for both the fluororesin and the substrate in advance.

The fluororesin layer is generally required to be thickened in uses requiring corrosion resistance. In order to thicken the fluororesin layer, it is necessary to repeat coating of applying a coating composition comprising fluororesin and baking the applied coating composition at temperatures not lower than a melting point of fluororesin. A primer is required to have heat-resistant adhesion capable of withstanding the long-duration baking at elevated temperatures and maintaining adhesion to a substrate and the like.

As the primer excellent in the heat-resistant adhesion, there has been widely adopted a primer based on chromate phosphate, having excellent resistance to long-duration baking at elevated temperature, until today. However, since there is growing awareness of environmental issues, the development of a chromium-free primer, which does not contain hexavalent chromium but has the strong heat-resistant adhesion comparable to the primer based on chromate phosphate, has been strongly desired over the years.

As a chromium-free primer, a combination of fluororesins and various binder resins has been conventionally studied. As the binder resins, there was proposed the use of polyphenylene sulfide (PPS) from the viewpoint of heat resistance. However, PPS had a problem in that PPS was poor in compatibility with the fluororesin and adhesion to the fluororesin was insufficient.

In order to improve the adhesion to the fluororesin, it was proposed that polyamide-imide (PAI) and/or polyimide (PI) are/is added to PPS as the binder resin in the chromium-free primer (see, for example, Japanese Kokai Publication sho-53-74532), In an example in this publication, PAI and PPS are used in a ratio of 1:15 to 1:20.

As the chromium-free primer using PPS and PAI as binder resin, one using PAI and PPS in a ratio of 3:1 to 1:3 was also proposed (see, for example, U.S. Pat. No. 5,789,083). However, this chromium-free primer has a feature in blending two kinds of fluororesins differing in melt viscosity each other in a specific ratio in order to provide a water-based primer capable of applying to a smooth surface, and there was a problem in that heat-resistant adhesion was deteriorated due to a long-duration baking.

As the binder resin of the chromium-free primer, one having PAI and PPS in a ratio of 1:1 is known (see, for example, Japanese Kokai Publication Hei-8-322732), but there was a problem in durability for hot water.

Thus, the binder resin comprising PAI and PPS has been conventionally developed on a course of adding a small amount of PAI to a large amount of PPS.

As a composition comprising PAI and an antioxidant, for example, PAI is exemplified as a resin (I) having at least one of an ester bond, an amide bond and an imide bond, and there is disclosed a substance comprising the resin (I) and an antioxidant (III) which accounts for 0.1 to 5 weight % of the resin (I) (see, for example, Japanese Kokai Publication Hei-2-4880). However, this composition is limited to use in coating of copper such as copper wires and there are no descriptions or suggestions about uses as a primer. In addition, there is no description of the use of poly(arylene sulfide) such as PPS as the antioxidant (III).

Although PAI is employed in various parts where heat resistance is required after a process of kneading and molding, there has been a problem in that amide groups of PAI were low in heat resistance and PAI is likely to deteriorate at elevated temperature.

SUMMARY OF THE INVENTION

In consideration of the above circumstances, it is an object according to the present invention to provide a coating composition free from hexavalent chromium to serve as a binder component but having adhesion comparable to the primer based on chromate phosphate even if baked at elevated temperature for a long time. It is another object according to the present invention to provide a composition in which the heat resistance of resin having an amide group is improved.

The present invention provides a coating composition comprising an amide group-containable macromolecule compound (A) having an amide group or to have an amide group and an anti-oxidizing material (B) capable of inhibiting oxidation of the amide group, wherein said amide group-containable macromolecule compound (A) is an amide group-containing polymer (a1) having an amide group and an aromatic ring, and/or an amide group-containing-polymer precursor (a2) to convert into said amide group-containing polymer (a1) by baking at a time of coating with said coating composition, and said anti-oxidizing material (B) accounts for 0.1 to 20 mass % of a total amount of said amide group-containable macromolecule compound (A) and said anti-oxidizing material (B).

The present invention also provides a coating composition comprising an amide group-containable macromolecule compound (A) having an amide group or to have an amide group and an anti-oxidizing material (B) capable of inhibiting oxidation of said amide group, which is a primer composition, and in which said amide group-containable macromolecule compound (A) is an amide group-containing polymer (a1) having an amide group and an aromatic ring, and/or an amide group-containing-polymer precursor (a2) to convert into said amide group-containing polymer (a1) by baking at a time of coating with said coating composition, and said anti-oxidizing material (B) accounts for 0.1 to 20 mass % of a total amount of said amide group-containable macromolecule compound (A) and said anti-oxidizing material (B).

The present invention also provides a coating composition free from hexavalent chromium to serve as a binder component, which is a chromium-free primer, and in which a for-measurement coating film, obtained by coating with said coating composition onto an article to be coated, has a peel strength of 3 kgf/cm or more after a heat resistance test comprising placing said for-measurement coating film for 50 hours at a temperature of 350° C. and a peel strength of 3 kgf/cm or more after a hot water treatment resistance test comprising immersing said for-measurement coating film for 120 hours in hot water of 90° C. or more.

The present invention also provides a fluoro-laminate comprising an article to be coated, a coating film obtained by coating with said coating composition onto an article to be coated, and a fluororesin layer, wherein said fluororesin layer comprises a fluororesin (D), and said article to be coated, said coating film and said fluororesin layer are laminated in this order.

The present invention also provides a resin composition comprising an amide group-containable macromolecule compound (A) having an amide group or to have an amide group and a poly(arylene sulfide), wherein said amide group-containable macromolecule compound (A) is an amide group-containing polymer (a1) having an amide group and an aromatic ring, and/or an amide group-containing-polymer precursor (a2) to convert into said amide group-containing polymer (a1) by baking at a time of coating with the coating composition, and said poly(arylene sulfide) accounts for 1 to 40 mass % of a total amount of said amide group-containable macromolecule compound (A) and said poly(arylene sulfide).

DETAILED DISCLOSURE OF THE INVENTION

Hereinafter, the present invention will be described in detail.

A coating composition according to the present invention comprises an amide group-containable macromolecule compound (A) having an amide group or to have an amide group and an anti-oxidizing material (B) capable of inhibiting oxidation of the above-mentioned amide group.

The coating composition according to the present invention provides a coating film by coating with it onto an article to be coated. In this specification, the term "coating" means a sequence of steps of applying the coating material to objects of coating such as an article to be coated, drying it as required, and then baking it. The above-mentioned baking means heating at a temperature not lower than a melting point of a principal polymer component in the coating composition according to the present invention. The above-mentioned heating temperature varies with whether presence or absence of a fluororesin (C) to be described later in the coating composition according to the present invention and with each melting point of the amide group-containable macromolecule compound (A), the anti-oxidizing material (B) and the fluororesin (C) to be described later.

The amide group-containable macromolecule compound (A) is an amide group-containing polymer (a1) having an amide group and an aromatic ring, and/or an amide group-containing-polymer precursor (a2) to convert into the amide group-containing polymer (a1) by baking at a time of coating with the coating composition.

The amide group-containing polymer (a1) is a polymer generally having an amide group (—NH—C(=O)—) in a main chain or a side chain and has an aromatic ring in a main chain.

Preferably, the amide group-containing polymer (a1) comprises polyamide-imide (PAI), polyamide, and/or polyamidic acid (polyamic acid).

The above-mentioned PAI is a polycondensate having an amide group, aromatic ring and an imide group. The above-mentioned PAI is not particularly limited, and includes a compound having an amide group introduced by oxidizing polyimide (PI), and the like in addition to generally known PAI.

The above-mentioned polyamide is a polycondensate having an amide bond (—NH—C(=O)—) in a main chain. The above-mentioned polyamide is not particularly limited, and includes aliphatic polyamides such as nylon 6, nylon 66, nylon 11 and nylon 12, and aromatic polyamides such as poly(paraphenylene terephthalamide) and poly(metaphenylene isophthalamide), and the like.

The above-mentioned polyamic acid is a polycondensate having the amide group, and a carboxyl group or a derivative of a carboxyl group. The above-mentioned polyamic acid is not particularly limited, and includes a polyamic acid having a molecular weight of several thousands to several tens of thousands, and the like.

The amide group-containing-polymer precursor (a2) converts into the amide group-containing polymer (a1) by baking at the time of coating with the coating composition according to the present invention.

In case that the coating composition according to the present invention is used as a primer composition to be described later and, then, a top coating material is applied, the concept of the above-mentioned "baking at the time of coating with the coating composition" corresponds to (1) "baking" generally performed prior to coating with the top coating material after coating with this primer composition; (2) "baking" at the time of coating with the top coating material after the baking (1); or (3) "baking" at the time of coating with the top coating material without performing the baking (1), and in case that the coating composition according to the present invention is used in a one coat method to be described later, the concept of that corresponds to (4) "baking" after coating with the coating composition but can include any of the concepts (1) to (4).

As described above, the amide group-containing-polymer precursor (a2) converts into the amide group-containing polymer (a1) by baking at the time of coating with the coating composition, and the aromatic ring of the amide group-containing polymer (a1) does not generally convert in this baking, therefore which precursor (a2) has an aromatic ring but no amide group before starting to bake the applied coating composition according to the present invention.

In this specification, a polymer compound having the amide group before starting to bake the applied coating composition and further an aromatic ring corresponds to the amide group-containing polymer (a1).

The amide group-containing-polymer precursor (a2) is not particularly limited as long as it is one to convert into the amide group-containing polymer (a1) by applying the coating composition according to the present invention and baking it, and it includes, for example, PI or the like. The above-mentioned PI can introduce an amide group in its main chain by applying the coating composition according to the present invention, followed by oxidizing it at the time of baking at elevated temperature for a long time. The amide group-containing polymer (a1) obtained by introducing the amide group to PI is PAI or a polyamic acid. PAI may be one provided as long as not all the imide groups in a main chain of PI are converted to amide groups. The polyamic acid may be one provided by converting all imide groups in a main chain of PI to amide groups or carboxyl groups.

A method of introducing the amide group to PI is not particularly limited, and includes a method of ring-opening imide groups (imide rings) of PI through oxidation, a method of hydrolyzing imide groups (imide rings) of PI by action of an alkaline, and the like. In this specification, a site on a molecular structure for an amide group to be introduced, for example, an imide group to be converted to an amide group by the oxidation as mentioned above may be referred to as an amide group-introducing site in some cases.

The amide group-containable macromolecule compound (A) has an amide group or is to have an amide group.

The above-mentioned phrase "is to have an amide group" means that the amide group-containable macromolecule compound (A) does not necessarily have the amide group at the time of blending the amide group-containable macromolecule compound (A) in order to prepare the coating composition according to the present invention but baking at a time of coating with the coating composition causes a chemical reaction to render an amide group introduced before the completion of this baking.

In this specification, a concept of a phrase "having an amide group or to have an amide group" can include any of one having an amide group but no amide group-introducing site at the time of blending the amide group-containable macromolecule compound (A) in order to prepare the coating composition according to the present invention, one having no amide group but an amide group-introducing site at the time, and one having both an amide group and an amide group-introducing site at the time. That is, the coating composition according to the present invention may comprise both the amide group-containing polymer (a1) and the amide group-containing-polymer precursor (a2) or may comprise only any one of those.

The anti-oxidizing material (B) can inhibit the above-mentioned oxidation of the amide group. The anti-oxidizing material (B) preferably has an oxidation-reduction potential lower than that of an amide group, and nearly equal to or higher than that of an imide group, and more preferably has an oxidation-reduction potential higher than that of an imide group.

It is considered that the anti-oxidizing material (B) can retard the oxidation of the amide group due to its self-oxidization in preference to the oxidation of the amide group. As the anti-oxidizing material (B), a material having a low oxidation degree is considered to be preferable in that it can adequately inhibit the oxidation of the amide group. As the anti-oxidizing material (B), more preferred is one being a heat resistant material and being capable of inhibiting oxidation of the amide group. In case that the anti-oxidizing material (B) is a heat resistant material, even if baking at the time of coating with the coating composition according to the present invention is conducted for a long time, the anti-oxidizing material (B) keeps inhibiting the oxidation of the amide group because of hardly degrading or deteriorating and, therefore, it can maintain adhesion to an article to be coated through the amide group-containable macromolecule compound (A).

The anti-oxidizing material (B) may have the reduction capability of reducing the oxidized amide group in addition to the self-oxidation capability of self-oxidizing in preference to the oxidation of the amide group.

The anti-oxidizing material (B) may also have a property of inhibiting oxidation of the article to be coated in addition to the above-mentioned property of inhibiting the oxidation of the amide group.

The anti-oxidizing material (B) includes poly(arylene sulfide) (PAS); nitrogen-containing compounds; metals such as tin, zinc and phosphorus; and sulfur.

PAS is not particularly limited and includes poly (phenylene sulfide ketone), poly (phenylene sulfide sulfone), poly (biphenylene sulfide) and poly(phenylene sulfide) (PPS). In particular, PPS is suitably used. In case where the use of amines and the elution of metal ions are disfavored such as semiconductor manufacturing processes, PAS is preferably used.

As the anti-oxidizing material (B), a nitrogen-containing compound is also preferably used.

In this specification, the above-mentioned "nitrogen-containing compound" is one having nitrogen atoms in a molecule, and can inhibit both of the oxidation of the amide group and the oxidation of the article to be coated.

The nitrogen-containing compound includes aminic compounds, benzotriazole-based compounds, nitrogen/sulfur-containing compounds and the like.

The aminic compounds are compounds having amino groups, in which the amino group may form salts such as metallic salts. The aminic compounds are not particularly limited, but preferably include aromatic amines in that the stability at elevated temperature of 250° C. or more is desired. As the aromatic amine, amines having a phenyl group and/or a naphthyl group are preferable. The aromatic amines having a phenyl group and/or a naphthyl group are not particularly limited, and include dinaphthylamine, phenyl-α-naphthylamine, phenyl-β-naphthylamine, diphenyl-p-phenylenediamine, phenylcyclohexyl-p-phenylenediamine and the like.

The benzotriazole-based compounds are compounds having a chemical structure having benzotriazole as a base skeleton and being allowed to form salts such as metallic salts. The benzotriazole-based compounds are not particularly limited and include benzotriazole, 2-(2-hydroxy-5-methylphenyl)benzotriazole, 2-(2-hydroxy-5-tetraocthylphenyl)benzotriazole and the like.

The nitrogen/sulfur-containing compounds are compounds having nitrogen atoms and sulfur atoms and being allowed to form salts such as metal salts. The nitrogen/sulfur-containing compounds are not particularly limited, and include benzothiazole-based compounds, sulfenamide-based compounds, thioureas and the like. The benzothiazole-based compounds are not particularly limited as long as these are compounds having benzothiazole as a base skeleton, and include 2-mercaptobenzothiazole, di-2-benzothiazole disulfide, 2-(N,N'-diethylthiocarbamoylthio) benzothiazole, di-2-benzothiazolyl disulfide and the like.

The sulfenamide-based compounds are not particularly limited as long as these are compounds having sulfenamide groups, and include N,N'-cyclohexyl-benzothiazolyl-sulfenamide, N-tert-butyl-2-benzothiazolyl-sulfenamide, N-oxydiethylene-2-benzothiazolyl-sulfenamide, N,N'-dicyclohexyl-2-benzothiazolyl-sulfenamide, N,N'-diisopropylbenzothiazole-2-sulfene and the like. In this specification, the sulfenamide-based compounds mean one having sulfenamide groups and further having benzotriazole as a base skeleton in its structural part.

As the thioureas, preferred are thioureas in which a saturated or unsaturated hydrocarbon group having 1 to 6 carbon atoms may be substituted for at least one of hydrogen atoms bond to nitrogen atoms. Such thioureas are not particularly limited and include N,N'-diethylthiourea, N,N'-dibutylthiourea, thiourea, N,N'-diphenylthiourea and the like.

In case where the article to be coated comprises an oxide films fast-forming metal easy to form an oxide film, as the anti-oxidizing material (B), preferred is use of the nitrogen-containing compound, and in view of improving the adhesion to the article to be coated, preferred is use of the nitrogen-containing compound together with PAS. The oxide film-fast-forming metal may be one easy to form an oxide film to the same extent as stainless steel at least by baking at the time of coating with the coating composition according to the present invention or, as an article to be coated, one having the oxide film already formed at the time of applying the coating composition according to the present invention thereto. The above-mentioned oxide film-fast-forming metal includes stainless steel and the like.

As the nitrogen-containing compound, benzothiazole-based compounds are suitably used, and among the benzothiazole-based compounds, a zinc-based antioxidant, which is salt thereof with zinc, is suitably used.

In case where the article to be coated comprises an oxide film-slow-forming metal, as the anti-oxidizing material (B), the nitrogen-containing compound may be used, however does not necessary be used because there is not significant reduce in the adhesion to the article to be coated due to baking at the time of coating with the coating composition according to the present invention even if not using the nitrogen-containing compound. It meets the case to use one not necessarily having a property to inhibit the oxidation of the article to be coated but having a property to inhibit the oxidation of the amide group described above, and, for example, use of only PAS may be allowed. In this specification, the above-mentioned oxide film-slow-forming metal is a metal slower in a rate of forming an oxide film than stainless steel. The oxide film-slow-forming metal differs from the oxide film-fast-forming metal in that degrees of properties of the formation of oxide film are different. The oxide film-slow-forming metal includes aluminum, iron and the like.

The anti-oxidizing material (B) accounts for 0.1 to 20 mass % of the total amount of the amide group-containable macromolecule compound (A) and the anti-oxidizing material (B). When it exceeds 20 mass %, adhesion after hot water treatment is likely to decrease. When it is less than 0.1 mass %, adhesion after heat treatment is likely to decrease. The anti-oxidizing material (B) may be used in combination of one or more kinds thereof. When it is used in combination, a mass of the anti-oxidizing material (B) is a total mass of all anti-oxidizing materials (B) combined.

As the anti-oxidizing material (B), PAS and/or the nitrogen-containing compound is preferably used.

In case that PAS is used alone as the anti-oxidizing material (B), PAS preferably accounts for 1 to 20 mass % of the total amount of the amide group-containable macromolecule compound (A) and PAS. When it is less than 1 mass %, adhesion after heat treatment is likely to decrease. When it exceeds 20 mass %, adhesion after hot water treatment is likely to decrease. Preferably, a lower limit is 3 mass % and an upper limit is 18 mass %, and more preferably, a lower limit is 5 mass % and an upper limit is 15 mass %.

When the nitrogen-containing compound is used alone as the anti-oxidizing material (B), the nitrogen-containing compound preferably accounts for 0.1 to 5 mass % of the total amount of the amide group-containable macromolecule compound (A) and the nitrogen-containing compound. Wen it is less than 0.1 mass %, adhesion after heat treatment is likely to decrease. When it exceeds 5 mass %, initial adhesion and adhesion after hot water treatment is likely to decrease. A more preferable upper limit is 3 mass %, and a further preferable upper limit is 1 mass %.

When PAS and another anti-oxidizing material are used in combination as the anti-oxidizing material (B), it is preferable to combine PAS and another anti-oxidizing material so as to be in a ratio of 50:50 to 99:1. Another anti-oxidizing material includes one other than PAS of anti-oxidizing materials (B) as mentioned above and, in particular, nitrogen-containing compounds are preferably used. Another anti-oxidizing material includes nitrogen-containing compounds, metals such as tin, zinc and phosphorus, and sulfur.

Preferably, the coating composition according to the present invention comprises the amide group-containable macromolecule compound (A), the anti-oxidizing material (B), and further a fluororesin (C).

The coating composition according to the present invention comprising the fluororesin (C) can form, by coating, a coating film structurally separated into two layers of a first layer (front layer) based on the fluororesin (C) and a second layer based on the amide group-containable macromolecule compound (A) and the anti-oxidizing material (B). In case of laminating a fluororesin layer comprising a fluororesin (D) on the first layer, the coating composition according to the present invention comprising the fluororesin (C) can form the coating film excellent in the adhesion to the fluororesin layer because of compatibility with the fluororesin (C) in the first layer and the fluororesin (D).

Although the coating film structurally separated into two layers is referred to as "structurally separated into two layers in structure" in this specification for convenience sake, actually, the concentration of the amide group-containable macromolecule compound (A) and the anti-oxidizing material (B) increases as it is closer to the article to be coated and the concentration of fluororesin (C), in place of the anti-oxidizing material (B), increases with distance from the article to be coated, and therefore it is considered that the fluororesin (C) is present in high concentration on the uppermost face of the coating film. Therefore, in the coating film, there may be cases where a kind of intermediate layer comprising the amide group-containable macromolecule compound (A) and the fluororesin (C) is present between a layer comprising the fluororesin (C) and a layer comprising the amide group-containable macromolecule compound (A) and the anti-oxidizing material (B), depending on the amount of each component blended.

In the coating composition according to the present invention, it is preferable that the fluororesin (C) is one having a baking temperature 300° C. or more at the time of baking.

The baking temperature at the tine of coating is not lower than a melting point of the fluororesin (C), generally. Description about the baking temperature at the time of coating is the same as the content of description about the amide group-containing-polymer precursor (a2) given in the above-mentioned "baking at a time of coating with the coating composition".

The coating composition according to the present invention is hard to reduce in the adhesion to the article to be coated even after baked at a temperature of 300° C. or more for a long time of several tens hours. Although such an excellent heat-resistant adhesion could be conventionally provided only by using a chromium-based primer, the coating composition according to the present invention can perform an excellent heat-resistant adhesion even when using no chromium or chromium compounds.

The fluororesin (C) comprises a polymer obtained by polymerizing a monomer having fluorine.

The fluororesin (C) preferably comprises a fluorine-containing polymer obtained by polymerizing one or more kinds of fluorine-containing monomers selected from the group of fluorine-containing monomers consisting of chlorotrifluoroethylene (CTFE), trifluoroethylene, tetrafluoroethylene (TFE), hexafluoropropylene (HFP), vinylidene fluoride (VdF), and perfluoro(alkyl vinyl)ether (PAVE), and this fluorine-containing polymer may be obtained by copolymerizing the above-mentioned one or more kinds of the above-mentioned fluorine-containing monomers with one or more kinds of fluorine-free monomers selected from the group of fluorine-free monomers such as ethylene and propylene.

The fluororesin (C) comprising tetrafluoroethylene-based copolymer is more preferable in view of corrosion resistance.

In this specification, the above-mentioned "tetrafluoroethylene-based copolymer" is polymers obtained by polymerizing TE>with fluorine-free monomers and/or fluorine-containing monomers other than TiFE in the above-mentioned group of fluorine-containing monomers. As the fluorine-containing monomers other than LE; and the fluorine-free monomers, one or more kinds of monomers, respectively, may be used.

The fluororesin (C) further preferably has a melting point of less than a baking temperature at the time of coating and heat resistance at the baking temperature.

As the fluororesin (C), perfluororesins are preferably employed in the view of having both corrosion resistance and heat resistance.

The perfluororesins are resins generally requiring a baking temperature of 300° C. or more, and include perfluoro polymers obtained by polymerizing perfluoro olefines with perfluorovinylether and/or a trace comonomer. The perfluoroolefine is not particularly limited, and includes TIFE, HFP and the like. The above-mentioned perfluorovinylether is not particularly limited, and includes perfluoro (methylvinylether), perfluoro(ethylvinylether), perfluoro(propylvinylether) and the like.

As the trace comonomer, there can be used one or more kinds of fluorine-free monomers and/or fluorine-containing monomers not being the perfluoroolefines nor perfluorovinylether as mentioned above. Preferably, a repeating unit derived from the trace comonomer in a molecular chain of the perfluoro polymers is less than 10 mol % of all monomer units of the perfluoro polymers.

As the fluororesin (C), dispersion or powder obtained by emulsion polymerization or suspension polymerization can be employed and, in addition, fine powder micronized by milling can be employed.

Preferably, the average particle diameter in the case of using the fluororesin (C) in powder form is preferably in a range of 0.1 to 50 μm. When it is less than 0.1 μm, the fluororesin layer can not be thickened so much, and when it exceeds 50 μm, the smoothness of the coating film obtained by coating with the coating composition according to the present invention may become poor in some cases. For a thin coat, a more preferable upper limit of the average particle diameter is 10 μm. For linings having a film thickness exceeding 200 μm, a more preferable lower limit of the average particle diameter is 1 μm, a more preferable upper limit is 40 W and a further preferable lower limit is 5 μm.

In this specification, values of the average particle diameter are determined by measurements with a laser type particle size analyzer.

Preferably, the fluororesin (C) accounts for 50 to 90 mass % of the total amount of the amide group-containable macromolecule compound (A), the anti-oxidizing material (B) and the fluororesin (C). Fen it is less than 50 mass %, in the case where the coating composition is used as a primer composition to be described later, the adhesion is likely to became poor between a coating film obtained by coating with the primer composition and a fluororesin layer laminated on the coating film. Mien it exceeds 90 mass %, the adhesion is likely to become poor between the above-mentioned coating film and an article to be coated to be described later. More preferably, a lower limit is 60 mass % and an upper limit is 85 mass %.

The above-mentioned ranges of numerical value are values with respect to a mass of solid content of the fluororesin (C). There are occasions when the fluororesin (C) is mixed in a form of liquid material such as dispersion at preparing the coating composition according to the present invention, and in this case the above-mentioned mass of solid content of the fluororesin (C) corresponds to a dry mass of powder obtained by taking particle comprising the fluororesin (C) in the liquid material.

The coating composition according to the present invention may be one blended, as required, with another resins having heat resistance of 200° C. or more, which is not any of the amide group-containable macromolecule compound (A), the anti-oxidizing material (B) and the fluororesin (C) for the purpose of improving a film formation property and corrosion resistance of the coating film prepared from the coating composition.

Another resins as mentioned above are not particularly limited, and include poly(ether sulfone) resin, poly(ether ether ketone) resin and poly(ether ketone) resin. One or more kinds of these can be used.

The coating composition according to the present invention may contain additives as required in order to improve the workability of coating film and properties of a coating film obtained from the coating composition.

The additives are not particularly limited, and include an leveling agent, a solid lubricant, a pigment, a bright material, a filler, a pigment dispersant, an anti-settling agent, a water absorbent, a surface control agent, a thixotropic agent, a viscosity adjustor, an antigelling agent, an ultraviolet absorber, a light stabilizer, a plasticizer, an anti-flooding agent, an anti-skinning agent, a slip agent, a fungicide, an antibacterial agent, an anti-corrosion agent, an antistatic agent and a silane coupling agent.

In this specification, an anti-corrosion agent means one having a property of not inhibiting the oxidation of the amide group but inhibiting the oxidation of the article to be coated.

The coating composition according to the present invention can be produced whether it is of a powder coating material type or of a liquid coating material type. In the coating composition according to the present invention, the amide group-containable macromolecule compound (A) and the anti-oxidizing material (B) may be used as a solution by being dissolved in a proper solvent. When a coating film having a thickness exceeding 100 μm is formed, preferred is of a powder coating material type as described later, but the coating composition according to the present invention is preferably of a liquid coating material type in that it can render an article to be coated applied uniformly thereto. As the liquid coating material type, preferred is one in which the amide group-containable macromolecule compound (A) and the anti-oxidizing material (B) are dissolved or dispersed in a dispersion containing a particle comprising the fluororesin (C) dispersed in a dispersion medium, and more preferably is one in which a particle comprising the amide group-containable macromolecule compound (A), a particle comprising the anti-oxidizing material (B) and a particle comprising the fluororesin (C) are dispersed in a dispersion medium in order to thicken the film thickness. In case of a liquid coating material type comprising another resins blended, the coating composition according to the present invention is generally one in which, varying with kinds of the dispersion medium and solubility of another resins, particles comprising another resins are dispersed in the dispersion medium.

As the dispersion medium, water or an organic medium can be used. When water is used as the above-mentioned dispersion medium, a cationic surfactant, an anionic surfactant or a nonionic surfactant may be dispersed as a dispersant, but the nonionic surfactant is preferably used because it hardly remains in the obtained coating film. When water is used as the dispersion medium, a fluorine-based surfactant may also be used in combination.

The organic medium is not particularly limited, and includes: lower alcohols such as 1-butanol and diacetone alcohol; ketones such as methyl isobutyl ketone and methyl ethyl ketone; esters such as butyl acetate; amides such as N-methyl-2-pyrrolidone, N,N-dimethylacetamide, and N,N-dimethylformamide; and aromatic hydrocarbons such as toluene, xylene, trimethylbenzene, n-ethylethylbenzene, propylbenzene, and butylbenzene. One or more thereof can be used.

As the dispersion medium, further, a mixed solvent of water and the above-mentioned organic medium can be used.

The coating composition according to the present invention, in case of not comprising the fluororesin (C), can be obtained as a binder resin liquid in which the amide group-containable macromolecule compound (A), the anti-oxidizing material (B) and another resin to be used as desired, respectively as described above, are dissolved or dispersed in the organic medium and/or water.

The coating composition according to the present invention, in case of comprising the fluororesin (C), can be prepared by a method comprising mixing and stirring the dispersion of fluororesin (C) and the binder resin liquid. The dispersion of fluororesin (C) can be provided by a method which comprises wetting particles comprising the fluororesin (C) with the dispersion medium, followed by dispersing the particles with dispersants such as the nonionic surfactant or the anionic surfactant, or a method which comprises reducing the surface tension of the dispersion medium with the fluorine-based surfactant to thereby disperse the particles comprising the fluororesin (C).

Preferably, the above-mentioned mixing and stirring is performed by using a mill such as a basket mill, a dynamo mill or a ball mill.

The coating composition according to the present invention may be diluted with a poor solvent to adjust its viscosity as desired after mixing and stirring as mentioned above.

In the coating composition according to the present invention, when the amide group-containable macromolecule compound (A) is used in a state of particles, it is preferable that average particle diameters of particles comprising the amide group-containable macromolecule compound (A) and those of particles comprising the anti-oxidizing material (B) are smaller than those of particles comprising the fluororesin (C) and 20 μm or less. With respect to the average particle diameter of particles comprising the amide group-containable macromolecule compound (A) and particles comprising the anti-oxidizing material (B), it is possible to set a preferable lower limit at 0.01 μm and a more preferable lower limit at 0.1 μm as long as the average particle diameter falls within the above-mentioned range.

Particles comprising the amide group-containable macromolecule compound (A), particles comprising the anti-oxidizing material (B) and particles comprising the fluororesin (C) may be ones in a powder coating material type described above, but these particles preferably satisfy the above-mentioned conditions of the average particle diameter especially when these particles are of dispersions in which these particles are dispersed in a dispersion medium. When the coating composition according to the present invention is used as the powder coating material described above, a more preferable upper limit of the average particle diameters of particles comprising the amide group-containable macromolecule compound (A) and particles comprising the anti-oxidizing material (B) is 200 μm and a further preferable upper limit is 150 μm. The average particle diameter of particles comprising the fluororesin (C) is preferably in a range of 0.1 to 50 μm as described above.

The coating composition according to the present invention in case of comprising the fluororesin (C), as described above, generally enables to provide a coating film structurally separated into two layers and excellent in the adhesion to the article to be coated. Therefore, in case where it is intended to apply a coat having a fluororesin layer as a front layer, coating may be conducted only once by the so-called one coat method, or maybe conducted by forming the coating film with the coating composition according to the present invention as a primer composition, followed by coating with a top coating material.

The coating composition according to the present invention can suitably be used as a primer composition.

The primer composition is a coating composition for undercoating to be coated onto the article to be coated prior to coating with the top coating material. In this specification, a primer composition may be referred to as a primer. Preferably, the top coating material is, although varying with uses of the coated articles obtained by coating with a coating material comprising a fluororesin (D) in that it enables to impart general characteristics of the fluororesin such as corrosion resistance and a non-cohesion property. In this specification, a coating film obtained by coating with the coating material comprising a fluororesin (D) as the top coating material may be referred to as a fluororesin layer. The coating composition according to the present invention is namely a primer composition, and the primer composition is preferably a coating composition for undercoating of the fluororesin layer comprising the fluororesin (D). The fluororesin (D) will be described later.

Preferably, the coating composition according to the present invention is a chromium-free primer free from hexavalent chromium to serve as a binder component, in which a for-measurement coating film, obtained by coating with the coating composition onto the article to be coated, has a peel strength of 3 kgf/cm or more after a heat resistance test comprising placing the for-measurement coating film for 50 hours at a temperature of 350° C. and a peel strength of 3 kgf/cm or more after a hot water treatment resistance test comprising immersing the for-measurement coating film for 120 hours in hot water of 90° C. or more.

In this specification, the above-mentioned "chromium-free primer" means a primer in which hexavalent chromium does not serve as a binder component. The chromium-free primer is therefore a primer in which hexavalent chromium itself or a compound having hexavalent chromium does not serve as a binder component even if the primer comprises hexavalent chromium itself alone or a compound having hexavalent chromium, and preferred is a primer free from hexavalent chromium itself or from a compound having hexavalent chromium.

More preferably, the coating composition according to the present invention is a chromium-free primer free from chromium elements.

The coating composition according to the present invention, in case of comprising the fluororesin (C), enhances adhesion to the article to be coated and also contributes to enhance adhesion to the fluororesin layer due to compatibility to the fluororesin of both the top coating film and the primer composition. The coating composition according to the present invention, in case of not comprising the fluororesin (C), mainly contributes to enhance adhesion to the article to be coated.

Preferably, the coating composition according to the present invention is a chromium-free primer, preferably a chromium-free primer free from chromium elements, in which a for-measurement coating film, obtained by coating with the coating composition onto the article to be coated, has a peel strength of 3 kgf/cm or more after a heat resistance test comprising placing the for-measurement coating film for 50 hours at a temperature of 350° C. and a peel strength of 3 kgf/cm or more after a hot water treatment resistance test comprising immersing the for-measurement coating film for 120 hours in hot water of 90° C. or more (hereinafter, this may be referred to as "coating composition (Z1)").

The coating composition (Z1) of the present invention may be one satisfying the above-mentioned conditions but not necessarily being a coating composition comprising the amide group-containable macromolecule compound (A) and the anti-oxidizing material (B), described above, in which the anti-oxidizing material (B) accounts for 0.1 to 20 mass % of the total amount of the amide group-containable macromolecule compound (A) and the anti-oxidizing material (B) (hereinafter, this may be referred to as the coating composition (Y) according to the present invention).

The coating composition (Z1) according to the present invention is one in which a for-measurement coating film has a peel strength of 3 kgf/cm or more after a heat resistance test comprising placing the for-measurement coating film for 50 hours at a temperature of 350° C. The coating composition (Z1) according to the present invention is excellent in the heat resistance of the coating film to be obtained and can maintain adequate resistance and adhesion to the article to be coated in a long-term use of the coating film at elevated temperature such that a peel strength after the heat resistance test falls within the above-mentioned range.

A lower limit of the peel strength after the heat resistance test is preferably 5 kgf/cm, more preferably 7 kgf/cm. When the peel strength falls within a range described above, its upper limit can be set, for example, at 20 kgf/cm.

In this specification, peel strength is a force required to peel off a test piece at a peeling speed of 50 m/min in the direction of 90° with respect to the test piece in accordance with JIS K 6854-1 (1999) with a Tensiron universal tester.

The coating composition (Z1) according to the present invention is one in which a for-measurement coating film has a peel strength of 3 kgf/cm or more after a hot water treatment resistance test comprising immersing the for-measurement coating film for 120 hours in hot water of 90° C. or more. The coating composition (Z1) according to the present invention is excellent in the hot water resistance of the coating film to be obtained and can maintain adequate resistance and adhesion to the article to be coated even in applications of using the coating film under contact with hot water such that the peel strength after the hot water treatment resistance test falls within the above-mentioned range. A lower limit of the peel strength after the hot water treatment resistance test is preferably 5 kgf/cm, more preferably 7 kgf/cm. When the peel strength falls within a range described above, its upper limit can be set, for example, at 20 kgf/cm.

The coating composition (Z1) according to the present invention is one providing the for-measurement coating film with both the peel strength within the above-mentioned range after the heat resistance test and the peelstrengthwithinthe-above-mentionedrangeafterthehotwatertreatment resistance test. The coating composition (Z1) according to the present invention is thus excellent in adhesion to the article to be coated and the adhesion to the article to be coated can provide the adhesion compatible with or more excellent to the conventional primer based on chromate phosphate.

Preferably, the coating composition according to the present invention is a chromium-free primer free from chromium elements, in which a for-measurement coating film, obtained by coating with the coating composition onto the article to be coated with, has a peel strength of 2 kgf/cm or more after a heat-hot water treatment resistance test comprising the heat treatment of placing for 20 hours at a temperature of 350° C., followed by hot water treatment of immersing for 24 hours in hot water of 90° C. or more (hereinafter this may be referred to as "coating composition (Z2)").

The coating composition (Z2) according to the present invention may be one satisfying the above-mentioned conditions but not necessarily being the coating composition (Z1) according to the present invention or the coating composition (Y) according to the present invention, described above.

The heat-hot water treatment resistance test is one comprising immersing the coating film in hot water after heat treatment, and therefore it is more severe than the heat resistance test applied alone or the hot water treatment resistance test applied alone. The coating composition (Z2) according to the present invention can provide the coating film having the peel strength within the above-mentioned range even after such a severe heat-hot water treatment resistance test as well as being capable of maintaining adequate resistance and adhesion to the article to be coated in uses requiring both heat resistance and hot water resistance. A lower limit of the peel strength is more preferably 3 kgf/cm, further preferably 5 kgf/cm. When the peel strength falls within a range described above, its upper limit can be set, for example, at 15 kgf/cm.

Preferably, the coating composition according to the present invention is also a chromium-free primer free from chromium elements, in which a for-measurement coating film, obtained by coating with the coating composition onto the surface of the article to be coated, has a peel strength of 0.5 kgf/cm or more after a heat resistance and hot water treatment resistance test comprising the heat treatment for 30 hours at a temperature of 350° C., followed by hot water treatment with immersing the coat for 24 hours in hot water of 90° C. or more (hereinafter this may be referred to as "coating composition (Z3)").

The coating composition (Z3) according to the present invention may be one satisfying the above-mentioned conditions but not necessarily be any one of the coating composition (Z1) according to the present invention, the coating composition (Z2) according to the present invention or the coating composition (Y) according to the present invention.

The coating com position (Z3) according to the present invention can provide the coating film, even after a severe heat-hot water treatment resistance test, having the peel strength within the above-mentioned range, heat resistance, hot water resistance and excellent adhesion to the article to be coated. A lower limit is more preferably 1 kgf/cm, further preferably kgf/cm, and most preferably 6 kgf/cm. When it falls within the above-mentioned range, its upper limit can be set, for example, at 15 kgf/cm.

In this specification, in case of expressed merely as the coating composition according to the present invention without affixing letters of (Z1), (Z2), (Z3) or (Y), this may include any of the coating composition (Z1) according to the present invention, the coating composition (Z2) according to the present invention, the coating composition (Z3) according to the present invention or the coating composition (Y) according to the present invention without limiting to either thereof.

In each of the coating composition (Z1) according to the present invention, the coating composition (Z2) according to the present invention and the coating composition (Z3) according to the present invention, the for-measurement coating film is obtained by coating with the coating composition onto the article to be coated. The for-measurement coating film is a coating film obtained by using, as the article to be coated, the iron sheet (SS400, 100 mm in length×50 mm in width×1.5 mm in thickness, average roughness [Ra]=2 to 3 μm) treated at a blast pressure of 0.5 MPa by abrasive blast with aluminum powder, conducting spray coating with the coating composition onto this iron sheet so as to be 30 μm in film thickness after drying, drying the coat at 120° C. for 30 minutes, applying PFA powder coating material (average particle diameter: 220 μm, melt flow rate: 6 g/10 minutes) on the dried coat film obtained in such a way that the total film thickness after baking is 1 mm and baking the coating material at 350° C. for one hour.

The coating composition (Z1) according to the present invention, the coating composition (Z2) according to the present invention and the coating composition (Z3) according to the present invention can provide the peel strength within the above-mentioned range whether the article to be coated is an oxide film-slow-forming metal or an oxide film-fast-forming metal.

Preferably, the coating composition (Z1) according to the present invention, the coating composition (Z2) according to the present invention and the coating composition (Z3) according to the present invention are coating compositions comprising a heat resistant polymer compound.

More preferably, the coating composition (Z1) according to the present invention, the coating composition (Z2) according to the present invention and the coating composition (Z3) according to the present invention are coating compositions comprising the heat resistant polymer compound and further the anti-oxidizing material (B).

Preferably, the anti-oxidizing material (B) accounts for 0.1 to 20 mass % of the total amount of the heat resistant polymer compound and the anti-oxidizing material (B).

As the anti-oxidizing material (B), poly(arylene sulfide) is preferable. Wen the above-mentioned anti-oxidizing material (B) comprises polyallylene, the heat resistant polymer compound is preferably an amide group-containable macromolecule compound (A).

More preferably, the coating composition (Z1) according to the present invention, the coating composition (Z2) according to the present invention and the coating composition (Z3) according to the present invention are the coating composition (Y) according to the present invention.

The coating composition according to the present invention has heat-resistant adhesion withstanding the long-duration baking at elevated temperatures in coating. The mechanism for the coating composition according to the present invention to have the heat-resistant adhesion is, but not clear, considered as follows.

That is, it is considered that deterioration of the heat-resistant adhesion, which has been conventionally observed in primer layers comprising PAI, results from the oxidative deterioration of adhesive functional groups, in PAI, such as an amide group due to the long-duration baking at elevated temperature. It is considered that the coating composition according to the present invention could provide the heat-resistant adhesion comparable to the primer based on chromate phosphate by adding the anti-oxidizing material (B) inhibiting oxidation of the adhesive functional groups, which the amide group-containable macromolecule compound (A) such as PAI has, such as an amide group. Because addition of the fluororesin (C) to the coating composition according to the present invention allows the concentration of fluororesin (C) to increase with distance from the article to be coated through being coated just once, the coating composition according to the present invention can also provide the coating film excellent in the adhesion between a layer based on both the amide group-containable macromolecule compound (A) and the anti-oxidizing material (B) and a layer based on the fluororesin (C). The coating composition according to the present invention is also considered to be capable of improving the heat-resistant adhesion between the coating film comprising the coating composition according to the present invention and the fluororesin layer since a layer comprising the fluororesin (C) in its surface can be prepared as described above. In case where the fluororesin (C) has the adhesive functional group to be described later, the coating composition according to the present invention is also considered to allow further to improve the heat-resistant adhesion between the coating film comprising this coating composition and the fluororesin layer.

Preferably, the coating film obtained from the coating composition according to the present invention has a thickness of 10 to 300 μm. When the coating composition of the liquid coating type is used, the coating film preferably has a thickness of 10 to 100 μm, the coating film having a thickness exceeding 100 μm is preferably obtained by using the coating composition of the powder coating material type.

The fluoro-laminate according to the present invention comprises the article to be coated, the coating film and the fluororesin layer. The coating film is obtained by coating with the coating composition according to the present invention, thus coating with the coating composition according to the present invention onto the article to be coated in the fluoro-laminate. In the fluoro-laminate according to the present invention, the article to be coated, the coating film and the fluororesin layer are laminated in this order.

The article to be coated is an object coated with the coating composition according to the present invention.

The article to be coated is not particularly limited, and includes those made of metal such as aluminum, stainless steel (SUS) or iron; heat-resistant resin; or ceramic. Those made of metal are preferred. As the metal, elemental metals or alloy metals may be used, and oxide film fast-forming metals such as stainless steel, copper or copper alloy may be used in view of good adhesion to the obtained coating film, and oxide film slow-forming metals such as aluminum or iron may be used.

The oxide film-fast-forming metal is easy to form an oxide coat film on its surface and this oxide coat film is considered to cause lowering adhesion to a coating film obtained by coating with the conventional coating composition. The coating composition according to the present invention can provide adequate adhesion to the coating film even if the article to be coated comprises the oxide film fast-forming metal by using a material capable of inhibiting not only the oxidation of the amide group but also the oxidation of the article to be coated as an anti-oxidizing material (B).

Preferably, the article to be coated is one from which resin component is removed and roughened prior to coating with the coating composition according to the present invention from the viewpoint of improving adhesion to a coating film obtained by coating with this coating composition. The method of removing the resin component includes: a method comprising use of organic solvents or alkaline compounds; and a method comprising degrading the resin component at elevated temperature of 300° C. or more.

The coating film can be formed on the article to be coated by applying the coating composition according to the present invention, drying at a temperature of 80 to 150° C. for 10 to 60 minutes as required, and then baking.

As a method of applying the coating material, spray coating or application with a roller is preferably used when the coating composition according to the present invention is of a liquid coating material type. When the coating composition according to the present invention is of a powder coating material type, electrostatic spraying, application by fluidized bed coating and application by a Roto Lining process are preferably used.

As described above, although depending on melting points of the amide group-containable macromolecule compound (A), the anti-oxidizing material (B) and the fluororesin (C) in the coating composition according to the present invention, the baking is usually performed by heating the coating composition at temperatures not lower than a melting point of the fluororesin (C) for 10 to 60 minutes. When the coating composition according to the present invention is used as a primer composition, the baking may be conducted prior to coating with the top coating material or may be conducted concurrently with baking of the top coating material at the time of baking after applying the top coating material, without baking before coating with the top coating material.

The fluororesin layer is formed on the coating film, and comprises a fluororesin (D).

As the fluororesin (D), there may be used the same one as the fluororesin (C) when the coating composition according to the present invention does not comprise the fluororesin (C).

When the coating composition according to the present invention comprises the fluororesin (C), since more fluororesin (C) is present in the surface of the coating film formed by coating with the coating composition onto the article to be coated, it is preferred that as the fluororesin (D) in the fluororesin layer formed on the coating film, a fluororesin having the same composition as or the similar composition to the fluororesin (C) is used in the sense of enhancing compatibility with and adhesion onto the surface of the coating film.

The fluororesin layer may comprise the fluororesin (C) together with the fluororesin (D) from the viewpoint of enhancing adhesion to the coating film obtained by coating with the coating composition according to the present invention when the coating composition according to the present invention comprises the fluororesin (C).

The adhesion between the coating film obtained from the coating composition according to the present invention and the fluororesin layer can be improved by utilizing resins comprising polymer having a terminal functional groups as the fluororesin (C).

The terminal functional groups are not particularly limited, and include $—COOR^1$ (wherein $R^1$ represents a hydrogen atom, an alkyl group having 1 to 5 carbon atoms, or a perfluoroalkyl group having 1 to 3 carbon atoms), $—COF$, $—CONH_2$, $—CH_2OH$, $—COOM^1$, $—SO_4M^2$, $—SO_3M^3$ (wherein $M^1$, $M^2$ and $M^3$ are the same or different from one another and represent a I group atom or an atomic group capable of forming a univalent cation), and $—SO_4M^4{}_{1/2}$, $—SO_3M^5{}_{1/2}$ (wherein $M^4$ and $M^5$ are the same or different from one another and represent a II group atom, a transition metal such as iron or an atomic group capable of forming a divalent cation). The I group atom includes a hydrogen-atom, a sodium atom, a potassium atom and the like. The atomic group capable of a univalent cation includes an ammonium group and the like. The II group atom includes calcium, magnesium and the like. The transition metal includes iron and the like.

Preferably, an amount of the terminal functional group ranges from 50 to 100000 per one million carbon atoms in a chain of a polymer molecule of the fluororesin (C). When this amount is less than 50, the adhesion is likely to reduce, and when it exceeds 100000, foaming during baking becomes much, resulting in easy causing defects of the coating film. With respect to the amount per one million carbon atoms in a chain of a polymer molecule of the fluororesin (C), a lower limit is more preferably 100, further 500 and an upper limit is more preferably 50000, further 10000.

The value of the above-mentioned amount of the terminal functional group is obtained by measuring with an infrared spectrophotometer.

The amount of the terminal functional group in a polymer having the terminal functional group can be generally adjusted by polymerizing with a catalyst, a chain transfer agent and a polymerization condition, each suitably selected.

The amount of the above-mentioned terminal functional group in a polymer having the terminal functional group can be increased by polymerizing a monomer having the above-mentioned functional group.

When a polymer of fluororesin (C) obtained by polymerizing the monomer having the functional group as a monomer serves to the reaction with a reaction reagent such as acid or alkali appropriately or the treatment with heat, the (terminal) functional group converts in a part of a chemical structure due to the action of the reaction reagent or the heat.

The fluoro-laminate according to the present invention can be obtained by coating with the coating composition according to the present invention to obtain the coating film, then conducting coating with the top coating material comprising the fluororesin (D) onto the obtained one and baking the coating film at a temperature not lower than a melting point of the fluororesin (D) for 30 to 120 minutes.

As the top coating material comprising the fluororesin (D), a powder coating material type and a liquid coating type are selectively used depending on a desired coating film thickness as is the case with the coating composition according to the present invention, and it is preferable to use the powder coating material from the viewpoint of corrosion resistance (the viewpoint of thickening of a film thickness). For the top coating material comprising the fluororesin (D), dispersion mediums, dispersants, additives and another resins, which are the same as the coating composition according to the present invention, can be used.

Preferably, the fluororesin layer has a film thickness of 200 μm or more.

The coating composition according to the present invention can maintain adequate adhesion when the fluororesin layer has a film thickness of 200 μm or more, and is particularly useful for lining processing in which a long-duration baking at elevated temperatures is required.

The uses of the fluoro-laminate according to the present invention are not particularly limited, and include: uses of coatings of various wires such as heat-resistant enamel wire because of its higher resistance to degradation due to processing in comparison with conventional PAI enamel wire; uses related to electric/electronics industries such as parts of information equipment (paper separating lug, printer guide, gear, bearing), connectors, burn-in sockets, IC sockets, electric parts for oil field, relays, shields of electromagnetic wave, relay cases, switches, covers and buses of a terminal block;

uses related to machinery industries such as valve seats, seals for hydraulics, back-up rings, piston rings, wear bands, vanes, ball bearing retainers, rollers, cams, gears, bearings, labyrinth seals, pump parts, mechanical links, bushings, fasteners, spline liners, brackets, hydraulic pistons, chemical pump casings, valves, tower packing, coil bobbins, packing, connectors, gaskets and valve seals;

uses related to vehicles industries such as thrust washers, seal rings, gears, bearings, tappets, engine components (piston, piston ring, valve stir), transmission components (spool valves, ball check valve, sealant) and rocker arms;

and uses related to aerospace industries such as jet engine parts (bushing, washer, spacer, nut), power control clutches, bearings for door hinges, connectors, tube clamps, brackets, hydraulic components, antennas, radomes, frames, parts of fuel system, compressor parts, rocket engine components, wear strips, connector shelves and space structures. In addition to these uses, uses such as pin covers of a can making machine, parts for plating equipment, parts related to an atomic energy, ultrasonic transducers, potentiometer shafts and parts of hydrants are given.

The coating composition according to the present invention can be applied to the uses even when it also comprises the fluororesin (C), but it can be suitably applied to these uses when it does not comprise the fluororesin (C).

When the coating composition according to the present invention also comprises the fluororesin (C), as the uses of the fluoro-laminate according to the present invention, there are given in addition to the above-mentioned uses, for example, uses for corrosion resistance of mixer blades, tank inner surfaces, vessels, towers, centrifugal separators, pumps, valves, piping, heat exchangers, plating jigs, tank inner surfaces of the tank trucks and screw conveyors; uses related to a semiconductor such as ducts of a semiconductor factory; uses for industrial release such as rolls for office automation, belts for office automation, papermaking rolls, calendering rolls for producing a film and injection molds; uses related to household electrical appliances and kitchen appliances such as rice cookers, pots, hot plates, flatirons, fry pans, bread makers, bread baking trays, tops of gas cookers, bread baking sheets, skillets and kettles; uses related to industrial parts such as sliding members of a precision mechanism including various gears, papermaking rolls, calendering rolls, mold releasing parts, casings, valves, packing, coil bobbins, oil seals, fittings, antenna caps, connectors, gaskets, valve seals, buried bolts and buried nuts.

The resin composition according to the present invention is one comprising an amide group-containable macromolecule compound (A) having an amide group or to have an amide group and a poly(arylene sulfide), in which the amide group-containable macromolecule compound (A) is an amide group-containing polymer (a1) having an amide group and an aromatic ring, and/or an amide group-containing-polymer precursor (a2) to convert into the amide group-containing polymer (a1) by baking at the time of coating with the coating composition, and the poly(arylene sulfide) accounts for 1 to 40 mass % of the total amount of the amide group-containable macromolecule compound (A) and the poly(arylene sulfide).

The amide group-containable macromolecule compound (A) and the poly(arylene sulfide) are those respectively described above as to the coating composition according to the present invention. Since the resin composition according to the present invention comprises the amide group-containable macromolecule compound (A) and the poly (arylene sulfide), so that it can prevent thermal degradation of the amide group-containable macromolecule compound (A) in coating or preparing a molded article by using the resin composition, and/or under heating at elevated temperatures, for example, 200° C. or more during using the obtained coating film or the molded article, and provide a coating film and a molded article, each excellent in physical properties such as heat resistance and capable of adequately withstanding the long-term use at elevated temperatures.

As the amide group-containing polymer (a1) in the amide group-containable macromolecule compound (A), polyamide-imide (PAI) is preferable.

The poly(arylene sulfide) is one accounting for 1 to 40 mass % of the total amount of the amide group-containable macromolecule compound (A) and the poly(arylene sulfide). When it is less than 1 mass %, heat resistance of coating films or molded articles obtained is insufficient, and when it exceeds 40 mass %, characteristics of the amide group-containable macromolecule compound (A) cannot be adequately capitalized on. A lower limit is preferably 4 mass % and an upper limit is preferably 30 mass %.

The resin composition according to the present invention may be a liquid coating material or a powder coating material, but in an application to a thick coat, a powder coating material is preferable. When the powder coating material is used, the poly(arylene sulfide) preferably accounts for 1 to 40 mass % of the total amount of the amide group-containable macromolecule compound (A) and the poly(arylene sulfide). A lower limit is more preferably 10 mass %, furthermore preferably 20 mass %, particularly preferably 25 mass %. An upper limit is more preferably 38 mass %, furthermore preferably 35 mass %.

The resin composition according to the present invention may comprise the amide group-containable macromolecule compound (A), the poly(arylene sulfide) and further the nitrogen-containing compound. The nitrogen-containing compound has been described above as to the coating composition according to the present invention. The resin composition can prevent thermal degradation of the amide group-containable macromolecule compound (A) effectively due to the nitrogen-containing compound comprised therein.

The resin composition according to the present invention may comprises further a fluororesin, in addition to the amide group-containable macromolecule compound (A), poly (arylene sulfide) and the nitrogen-containing compound to be used as desired. The fluororesin is not particularly limited and, includes for example, one like the fluororesin (C). The resin composition according to the present invention can provide a coating film and a molded article having not only heat resistance but also fluororesin-specific properties such as water repellency, chemical resistance, and a non-cohesion property by containing the fluororesin.

The resin composition according to the present invention is a powder coating material and preferably comprises the amide group-containable macromolecule compound (A), poly(arylene sulfide), and further the fluororesin.

Since the resin composition according to the present invention is excellent in the heat resistance as described above, it can be suitably applied for forming the coating film and the various molded article each requiring these properties.

As a method of forming a coating film by using the resin composition according to the present invention, there can be employed the methods described above as to the coating composition according to the present invention. When PAI is used as the amide group-containable macromolecule compound (A), PAI can be suitably used as the liquid coating type because PAI is usually commercially available as varnish.

A method of preparing a molded article by using the resin composition according to the present invention is not particularly limited, and includes injection molding and the like. It is also possible to prepare a molded article having a desired configuration by cutting the molded article once prepared.

The uses of the molded article obtained by using the resin composition according to the present invention are not particularly limited, and include the uses associated with the fluorine-containing resin laminate according to the present invention.

BEST MODE FOR CARRYING OUT THE INVENTION

Hereinafter, the present invention will be described in more detail by way of examples, but the present invention is not limited by the examples.

EXAMPLE 1

10.00 g of polyamide-imide resin (trade name: HI-680, produced by Hitachi Chemical Co., Ltd., 30% solution of N-methyl-2-pyrrolidone) (PAI), 6.66 g of tetrafluoroethylene/perfluoro(alkyl vinyl)ether copolymer (PFA) (melting point: 310° C., average particle diameter: 25 µm) and 0.33 g of polyphenylene sulfide resin (PPS) (trade name: RYTON V-1, produced by Phillips Company) were added to a mixed solvent of 13.80 g of N-methyl-2-pyrrolidone and 9.20 g of methyl isobutyl ketone, and the mixture was dissolved and dispersed using a dispersed (trade name: THREE ONE MOTOR, manufactured by Shinto Scientific Co., Ltd.) to obtain the coating composition according to the present invention.

Spray coating with the coating composition was conducted onto the iron sheet (SS400, 100 mm in length×50 mm in width×1.5 mm in thickness, average roughness [Ra]=2 to 3 µm), which had been treated at a blast pressure of 1.0 MPa by abrasive blast using aluminum powder (trade name: TOSA EMERY #40, produced by Ujiden Chemical Industry Co., Ltd.), so as to be 30 µm in film thickness after drying, and dried at 120° C. for 30 minutes. PFA powder coating material (average particle diameter: 220 µm, melt flow rate: 6 g/10 minutes) was placed on the resulting dried coat of the coating composition in such a manner that the total film thickness after baking is 1 mm, and baked at 350° C. for one hour to obtain a laminate A.

A test piece was cut from the resulting laminate A and evaluated as follows.

Heat Resistance Test

A test piece on which lines were cut out in the width of 10 mm was put in an electric oven set at 350° C. and heated for 20 hours or 50 hours and, then, was cooled to room temperature, and peel strength was measured in the direction of a 90° angle with respect to the test piece at a tensioning speed of 50 mm/min with a Tensiron universal tester in accordance with JIS K 6854-1 (1999). However, when a coat of the test piece was peeled off after the heating, the peel strength was taken as zero.

Hot Water Treatment Resistance Test

A test piece on which lines were cut out in the width of 10 mm was immersed in hot water of 90° C. or more for 24 hours and, then, was cooled to roam temperature, and peel strength was measured in the direction of a 90° angle with respect to the test piece in the same manner as heat resistance test.

Evaluation of State of Peeling

In the test of peel strength, a state of peeling was observed and evaluated as follows.

/A: Peeling between an article to be coated and a baked coating film of a coating composition (substrate peeling)

/B: Peeling between a baked coating film of a coating composition and a PFA resin layer (delamination)

/C: Peeling due to breakage of a baked coating film of a coating composition (fracture of cohesion)

EXAMPLE 2

A laminate B was prepared by following the same procedure as Example 1 except for changing the amount of PFA in Example 1 to 13.32 g, and an evaluation same as Example 1 was performed.

EXAMPLE 3

A laminate C was prepared by following the same procedure as Example 1 except for changing the amount of PAI to 11.00 g and the amount of PPS used to 0.03 g, and an evaluation same as Example 1 was performed.

EXAMPLE 4

A laminate D was prepared by following the same procedure as Example 1 except for using 11.00 g of PAI and 0.03 g of a benzothiazole-based compound (zinc 2-mercaptobenzothiazolate), which is a zinc-based antioxidant, as an antioxidizing material, and an evaluation same as Example 1 was performed.

EXAMPLE 5

A laminate E was prepared by following the same procedure as Example 1 except for changing the amount of PAI to 8.88 g and the amount of PPS to 0.67 g, and an evaluation same as Example 1 was performed.

EXAMPLE 6

A laminate F was prepared by following the same procedure as Example 1 except for using 1.67 g of PFA in Example 1 and an evaluation same as Example 1 was performed.

EXAMPLE 7

A laminate G was prepared by following the same procedure as Example 1 except for using 23.31 g of PFA in Example 1, and an evaluation same as Example 1 was performed.

EXAMPLE 8

A laminate H was prepared by following the same procedure as Example 1 except for using 6.00 g of PFA and adding no PPS, and an evaluation same as Example 1 was performed.

EXAMPLE 9

A laminate I was prepared by following the same procedure as Example 1 except for using 5.55 g of PAI and 1.67 g of PPS, and an evaluation same as Example 1 was performed.

EXAMPLE 10

A laminate J was prepared by following the same procedure as Example 1 except for using 7.77 g of PAI and 1.00 g of PPS, and an evaluation same as Example 1 was performed.

EXAMPLE 11

A laminate K was prepared by following the same procedure as Example 1 except for using a stainless steel (SUS304, 100 mm in length×50 m in width×1.5 mm in thickness, average roughness [Ra]=2 to 3 μm), treated by abrasive blast with the same aluminum powder as Example 1, in place of the iron sheet used in Example 1, and an evaluation same as Example 1 was performed.

EXAMPLE 12

A coating composition was prepared by following the same procedure as Example 1 except for using a blend of 0.03 g of a benzothiazole-based compound (zinc 2-mercaptobenzothiazolate) and 0.33 g of PPS in place of 0.33 g of PPS as an anti-oxidizing material. Next, a laminate was prepared by following the same procedure as Example 1 except for changing the iron sheet used in Example 1 to the stainless steel used in Example 11, and an evaluation same as Example 1 was performed.

The results of the tests and evaluations are shown in Table 1. It is noted that /A, /B and /C in the table represent the above-mentioned evaluation of a state of peeling.

It was found from Table 1 that Examples 1 to 5 were small in reduction in the peel strength after the heat resistance test or after the hot water treatment resistance test as compared with Examples 6 to 10. It was also found that Example 12 was small in reduction in the peel strength after the heat resistance test as compared with Example 11.

EXAMPLE 13

Two treated iron sheets (100 mm in length×10 mm in width×1.5 mm in thickness), which had been treated by abrasive blast in the same manner as Example 1, were prepared. A coating composition prepared by following the same procedure as Example 1 except for not using PFA in Example 1 was applied to a vertical half area of one of the two iron sheets so as to be 30 μm in film thickness after drying, the other treated iron sheet was bonded to the area to which the coating composition was applied, and then the iron sheet was baked at 350° C. for one hour to prepare a test piece. After that, a heat resistance test and a hot water treatment resistance test were conducted to the test piece following the procedure of Example 1. In addition, tensile shear strength was measured in accordance with JIS K 6850 (1999) before and after the heat resistance test and the hot water treatment resistance test.

EXAMPLE 14

A test piece was prepared by following the same procedure as Example 11 except for using a coating composition in which not only PFA but also PPS was not used, and an evaluation same as Example 13 was performed.

Results are shown in Table 2. It is noted that /A, /B and /C in the table represent the above-mentioned evaluation of a state of peeling.

TABLE 1

| | | Contents of coating composition | | | | | |
| | | Anti-oxidizing material (B)/(amide group-containing polymer | | Peel strength of direction of 90° (kgf/cm) | | | |
| | Material of article to be coated | compound (A) + anti-oxidizing material (B)) (mass %) | Fluorocarbon resin (C): ((A) + (B)) (mass ratio) | Before test | Heat resistance test | | After hot water teatment resistance test |
| | | | | | After 20 hours | After 50 hours | |
| --- | --- | --- | --- | --- | --- | --- | --- |
| Example 1 | Iron | 10 | 2:1 | 9.9/C | 12.2/C | 8.5/C | 11.8/C |
| Example 2 | | 10 | 4:1 | 11.6/C | 13.3/C | 9.9/C | 12.4/C |
| Example 3 | | 1 | 2:1 | 10.5/C | 9.8/C | 8.2/C | 10.3/C |
| Example 4 | | 1 | 2:1 | 15.8/C | 13.3/C | 7.1/C | 13.9/C |
| Example 5 | | 20 | 2:1 | 8.9/C | 9.9/C | 7.8/C | 9.1/C |
| Example 6 | | 10 | 1:2 | 3.2/B | 3.5/B | 2.7/B | 3.0/B |
| Example 7 | | 10 | 7:1 | 8.5/C | 8.1/C | 7.6/C | 8.8/C |
| Example 8 | | 0 | 2:1 | 12.9/C | 8.0/C | 0.2/A | 11.8/C |
| Example 9 | | 30 | 2:1 | 8.5/C | 11.2/C | 3.7/A | 6.8/A |
| Example 10 | | 50 | 2:1 | 7.3/C | 7.5/C | 5.5/C | 2.7/A |
| Example 11 | Stainless steel | 10 | 2:1 | 12.8/C | 12.6/C | 2.6/A | 13.5/C |
| Example 12 | | 11 | 2:1 | 10.9/C | 11.5/C | 8.9/C | 11.1/C |

TABLE 2

| | Contents of Coating composition Anti-oxidizing material (B)/(amide group-containing polymer compound (A) + anti-oxidizing material (B)) (mass %) | Tensile shear strength (kgf/cm²) | | | After hot water treatment resistance test |
|---|---|---|---|---|---|
| | | Before test | Heat resistance test | | |
| | | | After 20 hours | After 50 hours | |
| Example 13 | 10 | 91/C | 89.2/C | 68.3/C | 83.3/C |
| Example 14 | 0 | 98/C | 0/A | 0/A | 82.9/C |

It was found from Table 2 that Example 13 was small in reduction in the tensile shear strength after the heat resistance test or after the hot water treatment resistance test as compared with Example 14.

EXAMPLE 15

A coating composition according to the present invention was prepared under the same conditions as Example 1. Spray coating with the resulting coating composition was conducted onto the iron sheet treated by abrasive blast, used in Example 1, so as to be 30 μm in film thickness after drying, dried at 120° C. for 30 minutes and baked at 350° C. for one hour to obtain a laminate M comprising an article to be coated and a coating film (a for-measurement coating film).

A test piece was cut from the resulting laminate M and evaluated as follows.

Heat Resistance Test

The same procedure as Example 1 was followed except that peel strength was also measured on a test piece heated at 350° C. for 30 hours. The results of the test are shown in Table 3(a).

Hot Water Treatment Resistance Test

The same procedure as Example 1 was followed except that peel strength was also measured on test pieces immersed in hot water of 90° C. or more for 72 hours and 120 hours, respectively. The results of the test are shown in Table 3(b).

Heat/Hot Water Treatment Resistance Test

On a test piece, on which lines were cut out in the width of 10 mm, was conducted heat treatment in which a test piece was put at a temperature of 350° C. for 20 hours or 30 hours, and then was conducted hot water treatment comprising immersing the test piece in hot water of 90° C. or more for 24 hours. Next, the test piece was cooled to room temperature and peel strength was measured in the direction of 90° with respect to the test piece in the same manner as the heat resistance test of Example 1. The results of these tests are shown in Table 4.

Comparative Example 1

A laminate for comparison was obtained by following the same procedure as Example 15 except for adding no PPS at the time of preparing a coating composition, and evaluated. The results were shown in Tables 3 and 4.

Comparative Example 2

A laminate for comparison was obtained by following the same procedure as Example 15 except for affording a primer based on chromate phosphate (trade name: 850-314/VM-7799=100/35, manufactured by DuPont Company) in place of the coating composition according to the present invention to coating, and evaluated. The results were shown in Tables 3 and 4.

Comparative Example 3

A laminate for comparison was obtained by following the same procedure as Example 15 except for affording a chromium-free primer (trade name: 420-703, manufactured by DuPont Company) for comparison in place of the coating composition according to the present invention to coating, and evaluated. The results were shown in Tables 3 and 4

TABLE 3 a)

| | Peel strength (kgf/cm) | | | |
|---|---|---|---|---|
| | Before test | Heat resistance test (350° C.) | | |
| | | After 20 hours | After 30 hours | After 50 hours |
| Example 15 | 13.1 | 13.6 | 14.2 | 10.8 |
| Comparative Example 1 | 15.6 | 8.5 | 3.4 | 3.3 |
| Comparative Example 2 | 9.9 | 10.5 | 10.6 | 6.0 |
| Comparative Example 3 | 8.5 | 5.5 | 4.8 | 0.8 | b)

| | Peel strength (kgf/cm) | | | |
|---|---|---|---|---|
| | Before test | Hot water treatment resistance test (90° C.) | | |
| | | After 24 hours | After 72 hours | After 120 hours |
| Example 15 | 10.4 | 10.0 | 9.2 | 8.5 |
| Comparative Example 1 | 15.1 | 12.5 | 12.9 | 13.9 |
| Comparative Example 2 | 9.8 | 7.3 | 5.9 | 5.0 |
| Comparative Example 3 | 9.0 | 5.5 | 3.5 | 2.7 |

It was found from Table 3 that the coating composition (a chromium free primer) of Example 15 did not reduced in the peel strength so much even after being subjected to long hours of the heat resistance test or the hot water treatment resistance test as compared with the chromium-free primer based on chromate phosphate of Comparative Example 2 and the conventional chromium-free primer for comparison of Comparative Example 3. In addition, it was found that in comparison of Example 15 with Comparative Example 1 free from PPS, the rate of reduction of the peel strength was about equal to each other in the hot water treatment resistance test but it was kept low in the heat resistance test.

TABLE 4 a)

| | Peel strength (kgf/cm) | | |
|---|---|---|---|
| | Before heat treatment | After heat treatment (350° C. for 20 hours) | After hot water treatment resistance test following heat treatment |
| Example 15 | 13.1 | 13.6 | 9.6 |
| Comparative Example 1 | 14.5 | 5.3 | 0 |
| Comparative Example 2 | 9.9 | 10.5 | 3.9 |
| Comparative Example 3 | 8.5 | 5.5 | 1.3 | b)

| | Peel strength (kgf/cm) | | |
|---|---|---|---|
| | Before heat treatment | After heat treatment (350° C. for 30 hours) | After hot water treatment resistance test following heat treatment |
| Example 15 | 13.1 | 14.2 | 7.7 |
| Comparative Example 1 | 18.6 | 3.4 | 0 |
| Comparative Example 2 | 11.3 | 10.6 | 1.5 |
| Comparative Example 3 | 8.5 | 5.5 | 0 |

It was found from Table 4 that in Example 15, the peel strength hardly reduced after heat treatment and further was kept low in thee rate of reduction even after hot water treatment and these results were much better than the primer based on chromate phosphate of Comparative Example 2 and on the other hand each peel strength of the coating composition of Comparative Example 1 free from PPS and the conventional chromium-free primer of Comparative Example 3 reduced significantly.

EXAMPLE 16

Polyamide-imide resin (trade name: TORLON 4000T-40, produced by Solvay Advanced Polymers K.K.) (PAI) was milled with a mill (trade name: ATOMIZER, manufactured by Dalton Corporation) to prepare particles comprising PAI milled having an average particle size of 50 μm. 90 g of the resulting particles comprising PAI milled, 400 g of tetrafluoroethylene/perfluoro(alkyl vinyl)ether copolymer (PFA) (melting point: 310° C., average particle diameter: 25 μm) and 10 g of polyphenylene sulfide resin (PPS) (trade name: RYTON V-1, produced by Phillips Company) were homogeneously dispersed with a mixer (trade name: V TYPE MIXER, manufactured by Dalton Corporation) to prepare the coating composition according to the present invention.

The coating composition was electrostatically applied onto the iron sheet (SS400, 100 mm in length×50 mm in width×1.5 mm in thickness, average roughness [Ra]=2 to 3 m), which had been treated at a blast pressure of 1.0 MPa by abrasive blast with aluminum powder (trade name: TOSA EMERY #40, produced by Ujiden Chemical Industry Co., Ltd.), so as to be 120 μm in film thickness, and baked at 350° C. for 30 minutes. PFA powder coating material (average particle diameter: 220 μm, melt flow rate: 6 g/10 minutes) was placed on the resulting dried coat film of the coating composition in such a manner that the total film thickness after baking is 1.1 mm, and baked at 350° C. for one hour to obtain a laminate N.

A test piece was cut from the resulting laminate N, and a heat resistance test and a hot water treatment resistance test were conducted to the test piece by following the same procedure as Example 15. Results are shown in Table 5. It is noted that /A, /B and /C in the table represent the evaluation of a state of peeling as mentioned above.

EXAMPLE 17

A laminate P was prepared by following the same procedure as Example 16 except for using 30 g of PPS and 70 g of PAI, and evaluated. Results are shown in Table 5.

EXAMPLE 18

A laminate Q was prepared by following the same procedure as Example 16 except for using 40 g of PPS and 60 g of PAI, and evaluated. Results are shown in Table 5.

Comparative Example 4

A laminate for comparison was prepared by following the same procedure as Example 16 except for using 50 g of PPS and 50 g of PAI, and evaluated. Results are shown in Table 5.

Comparative Example 5

A laminate for comparison was prepared by following the same procedure as Example 16 except for not using PPS and using 100 g of PAI, and evaluated. Results are shown in Table 5.

TABLE 5

| | Peel strength (kgf/cm) | | | |
|---|---|---|---|---|
| | Before test | Heat resistance test (350° C.) | | |
| | | After 20 hours | After 30 hours | After 50 hours |
| Example 16 | 10.1 | 10.5/C | 8.7/C | 5.2/C |
| Example 17 | 10.0 | 11.9/C | 10.4/C | 8.8/C |
| Example 18 | 8.8 | 10.1/C | 11.4/C | 9.1/C |
| Comparative Example 4 | 6.7 | 8.6/C | 9.3/C | 10.0/C |
| Comparative Example 5 | 12.4 | 2.1/A | 0.0/A | 0.0/C |

| | Peel strength (kgf/cm) | | | |
|---|---|---|---|---|
| | Before test | Hot water treatment resistance test (90° C.) | | |
| | | After 24 hours | After 72 hours | After 120 hours |
| Example 16 | 10.6 | 9.8/C | 8.5/C | 7.0/C |
| Example 17 | 10.5 | 10.5/C | 7.2/C | 6.5/C |
| Example 18 | 8.7 | 7.7/C | 5.0/C | 4.3/C |
| Comparative Example 4 | 6.1 | 7.1/C | 2.1/A | 1.2/A |
| Comparative Example 5 | 13.5 | 10.9/C | 8.9/C | 9.2/C |

It was found from Table 5 that all Examples 16, 17 and 18 have the peel strength of 3 kgf/cm or more both after the heat resistance tests for 50 hours and after the hot water treatment resistance test for 120 hours and, on the other hand, Comparative Example 4 has the peel strength of 1.2 kgf/cm after the hot water treatment resistance test for 120 hours and Comparative Example 5 has the peel strength of 0 kgf/cm after the heat resistance tests for 50 hours.

INDUSTRIAL APPLICABILITY

As constituted as described above, the coating con-position according to the present invention can provide the fluoro-laminate hard to reduce in the adhesion and has the heat-resistant adhesion comparable to the primer based on chromate phosphate even if baked at elevated temperature for a long time in coating. As constituted as described above, the resin composition according to the present invention can provide the coating film and the molded article excellent in the heat resistance.

The invention claimed is:

1. A fluoro-laminate comprising an article to be coated, a coating film obtained by applying a coating composition onto said article, and a fluororesin layer,
    wherein said fluororesin layer comprises a fluororesin (D) and has a film thickness of 200 μm or more,
    said article to be coated, said coating film and said fluororesin layer are laminated in this order,
    said coating composition comprises an amide and/or imide group-containing macromolecule compound (A), an anti-oxidizing material (B), and a fluororesin (C),
    said amide and/or imide group-containing macromolecule compound (A) is an amide group-containing polymer (a1) having an amide group and an aromatic ring, and/or a polymer precursor (a2) having an imide group, a part or all of which imide group is converted into an amide group by baking at a time of coating with said coating composition,
    said anti-oxidizing material (B) is capable of inhibiting oxidation of said amide group, and comprises a poly (arylene sulfide), and
    said anti-oxidizing material (B) accounts for 0.1 to 20 mass % of a total amount of said amide and/or imide group-containing macromolecule compound (A) and said anti-oxidizing material (B).

2. The fluoro-laminate according to claim 1, wherein the amide group-containing polymer (a1) comprises a polyamide-imide.

3. The fluoro-laminate according to claim 1, wherein the anti-oxidizing material (B) comprises a poly(arylene sulfide) and a nitrogen-containing compound.

4. The fluoro-laminate according to claim 1, wherein a particle comprising the amide and/or imide group-containing macromolecule compound (A), a particle comprising the anti-oxidizing material (B), and a particle comprising the fluororesin (C) are dispersed in a dispersion medium.

5. The fluoro-laminate according to claim 1,
    wherein said fluororesin (C) accounts for 50 to 90 mass % of a total amount of said amide and/or imide group-containing macromolecule compound (A), said anti-oxidizing material (B) and said fluororesin (C).

6. The fluoro-laminate according to claim 5, wherein the fluororesin (C) has a baking temperature of 300° C. or more at the time of coating.

7. The fluoro-laminate according to claim 5, wherein the fluororesin (C) comprises a perfluororesin.

8. The fluoro-laminate according to claim 5,
    wherein a particle comprising the amide and/or imide group-containing macromolecule compound (A), a particle comprising the anti-oxidizing material (B) and a particle comprising the fluororesin (C) are dispersed in the dispersion medium.

9. The fluoro-laminate according to claim 1,
    wherein the article to be coated comprises a metal easy to form an oxide film.

10. The fluoro-laminate according to claim 1,
    wherein the fluororesin layer is obtained by conducting coating with a powder coating material.

11. The fluoro-laminate according to claim 1,
    wherein the anti-oxidizing material (B) accounts for 0.1 to 15 mass % of a total amount of said amide and/or imide group-containing macromolecule compound (A) and said anti-oxidizing material (B).

12. A fluoro-laminate comprising an article to be coated, a coating film obtained by applying a coating composition onto said article, and a fluororesin layer,
    wherein said fluororesin layer comprises a fluororesin (D) and has a film thickness of 200 μm or more, said article to be coated,
    said coating film and said fluororesin layer are laminated in this order,
    said coating composition comprises an amide and/or imide group-containing macromolecule compound (A), an anti-oxidizing material (B), and a fluororesin (C),
    said coating composition is a primer composition,
    said amide and/or imide group-containing macromolecule compound (A) is an amide group-containing polymer (a1) having an amide group and an aromatic ring, and/or a polymer precursor (a2) having an imide group, a part or all of which imide group is converted into an amide group by baking at a time of coating with said coating composition,
    said anti-oxidizing material (B) is capable of inhibiting oxidation of said amide group, and comprises a poly (arylene sulfide), and
    said anti-oxidizing material (B) accounts for 0.1 to 20 mass % of a total amount of said amide and/or imide group-containing macromolecule compound (A) and said anti-oxidizing material (B).

13. The fluoro-laminate according to claim 12, wherein the amide group-containing polymer (a1) comprises a polyamide-imide.

14. The coating composition according to claim 12, wherein the anti-oxidizing material (B) comprises a poly (arylene sulfide) and a nitrogen-containing compound.

15. The fluoro-laminate according to claim 12, wherein a particle comprising the amide and/or imide group-containing macromolecule compound (A), a particle comprising the anti-oxidizing material (B), and a particle comprising the fluororesin (C) are dispersed in a dispersion medium.

16. The fluoro-laminate according to claim 12,
    wherein said fluororesin (C) accounts for 50 to 90 mass % of a total amount of said amide and/or imide group-containing macromolecule compound (A), said anti-oxidizing material (B) and said fluororesin (C).

17. The fluoro-laminate according to claim 16, wherein the fluororesin (C) has a baking temperature of 300° C. or more at the time of coating.

18. The fluoro-laminate according to claim 16, wherein the fluororesin (C) comprises a perfluororesin.

19. The fluoro-laminate according to claim 16,
    wherein a particle comprising the amide and/or imide group-containing macromolecule compound (A), a particle comprising the anti-oxidizing material (B) and a particle comprising the fluororesin (C) are dispersed in the dispersion medium.

20. The fluoro-laminate according to claim 12,
wherein the article to be coated comprises a metal easy to form an oxide film.

21. The fluoro-laminate according to claim 12,
wherein the fluororesin layer is obtained by conducting coating with a powder coating material.

22. The fluoro-laminate according to claim 12,
wherein the anti-oxidizing material (B) accounts for 0.1 to 15 mass % of a total amount of said amide and/or imide group-containing macromolecule compound (A) and said anti-oxidizing material (B).

* * * * *